United States Patent [19]

Landell

[11] 4,006,464
[45] Feb. 1, 1977

[54] INDUSTRIAL PROCESS CONTROLLER

[75] Inventor: William F. Landell, Saugerties, N.Y.

[73] Assignee: FX Systems, Inc., Kingston, N.Y.

[22] Filed: Feb. 20, 1975

[21] Appl. No.: 551,256

[52] U.S. Cl. .................. 340/172.5; 235/151.11
[51] Int. Cl.² .................. G06F 3/02; G06F 15/02
[58] Field of Search .................. 340/172.5; 445/1; 235/151.11, 151.1

[56] References Cited

UNITED STATES PATENTS

| | | | |
|---|---|---|---|
| 3,594,734 | 7/1971 | Wang et al. | 340/172.5 |
| 3,603,936 | 9/1971 | Attwood et al. | 340/172.5 |
| 3,668,653 | 6/1972 | Fair et al. | 340/172.5 |
| 3,750,109 | 7/1973 | Smith | 340/172.5 |
| 3,798,614 | 3/1974 | Meadows | 340/172.5 |
| 3,825,901 | 7/1974 | Golnek et al. | 340/172.5 |
| 3,838,400 | 9/1974 | Meadows | 340/172.5 |
| 3,859,635 | 1/1975 | Watson et al. | 340/172.5 |
| 3,893,084 | 7/1975 | Kotok | 340/172.5 |
| 3,909,802 | 9/1975 | Cassarino et al. | 340/172.5 |

*Primary Examiner*—Gareth D. Shaw
*Assistant Examiner*—Jan E. Rhoads
*Attorney, Agent, or Firm*—Daniel M. Rosen

[57] ABSTRACT

An industrial process controller provides an operator with a panel through which a program may be stored, reviewed, altered during review, and run without involving complex peripheral equipment.

6 Claims, 3 Drawing Figures

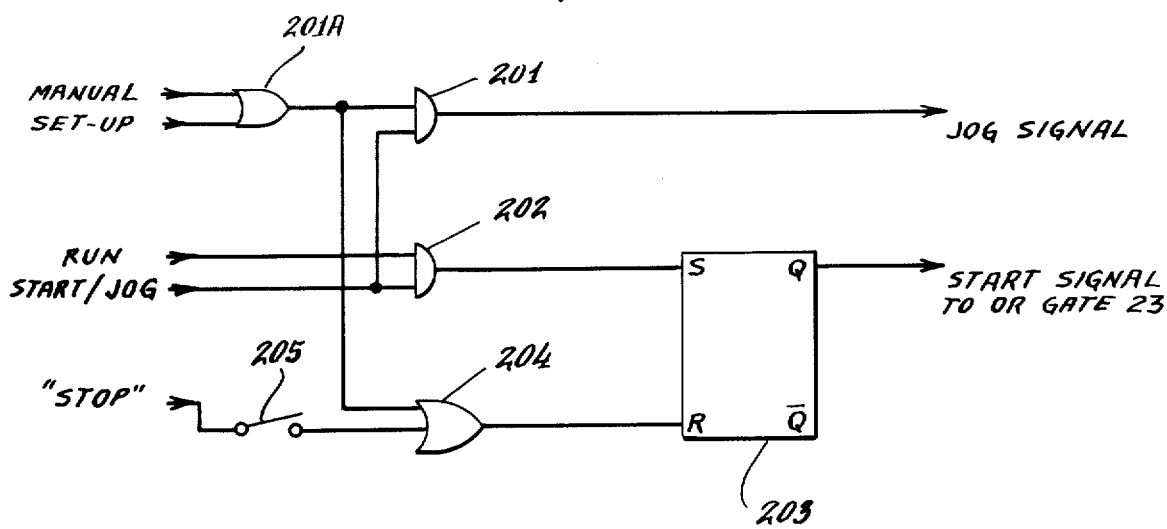

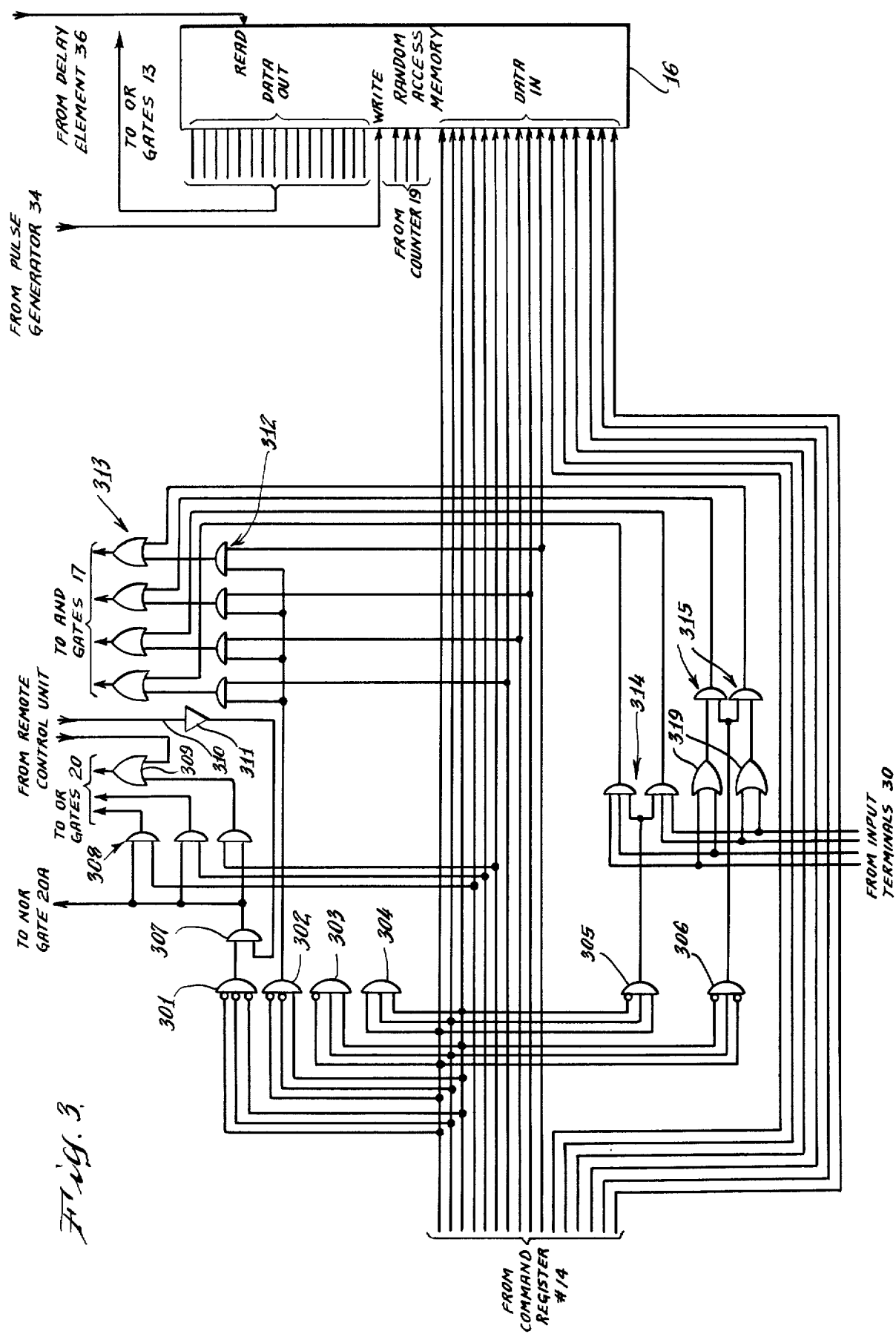

4,006,464

INDUSTRIAL PROCESS CONTROLLER

BACKGROUND OF THE INVENTION

The invention relates generally to industrial program controllers of the type wherein a simple process is to be sequentially provided with control signals.

In prior art industrial process controllers it had been necessary to route the program through some form of computer peripheral equipment and, on occasion, through a complex general purpose computer. In the event a program step did not satisfy the requirements it was generally necessary to rewrite the entire program or to purchase a corrected program in the form of magnetic tape or punched paper tape from a soft ware supplier. Mechanical sequencing devices such as rotating drums have also been used for industrial process control, but are necessarily slow, lack flexibility, and require attention.

It is an object of this invention to provide a simple electronic industrial process controller where no computer peripheral equipment would be necessary.

A further object is to provide a controller that could be programmed, reviewed and run by a single operator through a plurality of switches mounted on a single panel.

It is a further object of the invention to provide a controller where during a check out or review procedure of the program any of the program steps could be changed at will from the operator's panel without the necessity for completely rewriting the program.

SUMMARY OF THE INVENTION

The present invention is directed toward an industrial process controller wherein through a single panel a control process may be programmed, reviewed, and altered at will.

More particularly, the present invention provides a process control device wherein a plurality of digital program words define a signal level on output terminals of the controller and wherein the controller responds to such logic words by providing the selected signal levels. In addition, the invention relates to a process controller wherein program steps are sequentially performed and wherein, in response to a digital word of the program directing the process controller to go to an out-of-sequence step, the controller immediately indexes to the selected step and continues the sequential operation.

In addition, the invention relates in particular to a programmer wherein in response to a digital word defining a logic function to be performed on input signals of the controller logic circuits are provided whose outputs are connected to selected controller output circuits.

These and other features, advantages and objects of the present invention will be more fully appreciated from the following detailed description of a preferred embodiment of the invention taken in conjunction with the accompanying drawings in which:

BRIEF DESCRIPTION OF THE DRAWINGS

FIG. 2 is a schematic logic diagram of the "START and JOG" portions of the controller shown in FIG. 1, and FIG. 3 is a schematic logic diagram of the logic matrix shown in FIG. 1.

DETAILED DESCRIPTION OF THE PREFERRED EMBODIMENT

Figure 1:
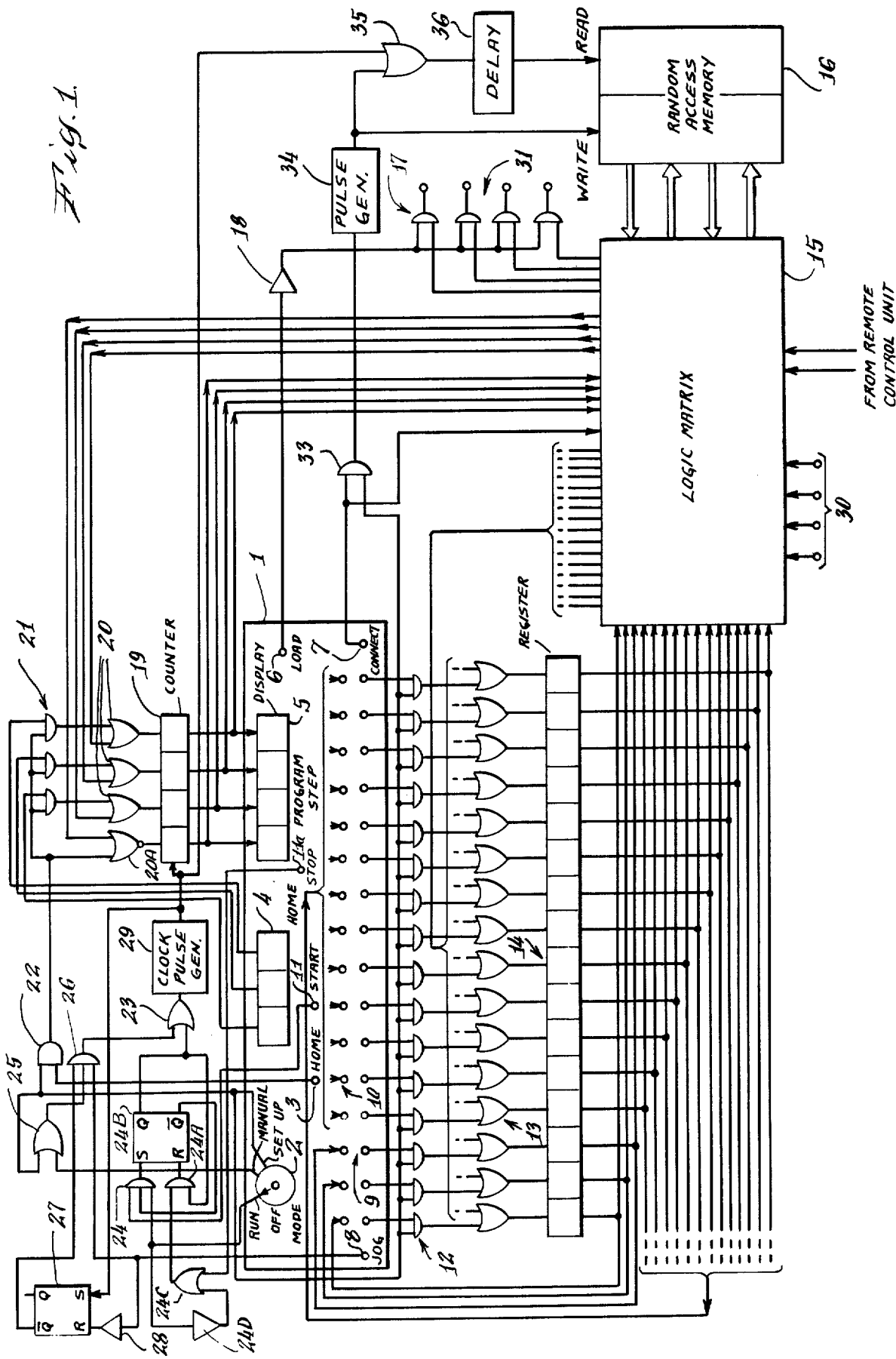
FIG. 1 is a schematic logic diagram of a preferred embodiment of the controller.

As shown in FIG. 1, a panel 1 is provided with a MODE switch 2 having OFF, RUN, MANUAL and SET-UP positions; a series of HOME switches 4, each switch having 10 positions; a PROGRAM STEP decimal display 5 for numerically indicating the current program step; a LOAD switch 6 for disconnecting load terminals 31 from attached loads (not shown); a HOME command switch 33 for transferring a program step numerically selected by setting the decimal coded HOME switches 4 into a PROGRAM STEP display 5; a START switch 11 for initiating a program; a STOP switch 11a; 16 COMMAND WORK SELECTION switches 9 for selecting the 16 bits of a command word; 16 COMMAND WORD INDICATOR lights 10 for displaying a command word; and a JOG switch 8 for stepping a program ahead by one step when the MODE switch is set to either of the MANUAL or SET-UP positions. Sixteen AND gates 12 each have a first input connected to one of the command word selection switches 9 and a second input connected to the SET-UP position of the mode switch. Sixteen OR gates 13 each have a first input connected to an output of one of the AND gates 12 and a second input connected to an output of logic matrix 15. Each stage of a 16 stage command register 14 has an input connected to the output of a corresponding OR gate 13. The output of each register stage 14 is connected to a corresponding COMMAND WORD INDICATOR light 10. In addition, the output of each register stage is connected to logic matrix 15. The RUN output of MODE switch 2 is connected to an input of AND gate 24. START switch 11 is a push button switch. The output of switch 11 is connected to a second input of AND gate 24. The output of AND gate 24 is connected to a set input of flip-flop 24B. A third input for AND gate 24 is provided by the $\overline{Q}$ output of flip-flop 24B. An output of STOP push button switch 11a is connected to an input of OR gate 24C. The RUN output of MODE switch 2 is connected through inverter 24D to a second input of OR gate 24C. The output of OR gate 24C is connected to an input of AND gate 24A. A second input for AND gate 24A is provided by the Q output of flip-flop 24B. With the MODE switch 2 in any position other than the RUN position, inverter 24D will provide logic 1 signal through OR gate 24C to AND gate 24A. Thus if the flip-flop 24B is in the "set" condition, the resultant Q output will reset the flip-flop 24B through AND gate 24A. When the MODE switch 2 is set to the RUN position from any other position the flip-flop 24B will therefore be in the "reset" condition. If the MODE switch is in the RUN position and the START button 11 is depressed, the output of the MODE switch, the START button and the $\overline{Q}$ output of flip-flop 24B will cause AND gate 24 to trigger the flip-flop 24B to the "set" condition. If thereafter the STOP switch 11a is depressed, the resultant output thereof through OR gate 24C combined with the Q output of flip-flop 24B will trigger the flip-flop 24B to the "reset" condition. OR gate 23 has an input connected to a Q output of flip-flop 24B. The output of OR gate 23 is connected to an input of clock pulse generator 29, and provides a turn-on signal for the clock pulse generator. The output of clock pulse generator 29 is connected to an input of counter 19 and increments the counter by one number with each clock pulse. The MANUAL and SET-UP outputs of MODE switch 2 are connected to separate inputs of OR gate 25. The output of OR gate 25 is connected to a first input of AND gate 26. The normally-on $\overline{Q}$ output of set-reset flip-flop 27 provides a second input for AND gate 26. The output of JOG switch 8 is connected through inverter 28 to the reset input of flip-flop 27. Thus, if JOG switch 8 is not depressed the flip-flop is maintained in a reset condition. JOG switch 8 is also connected directly to a third input of AND gate 26. When JOG switch 8 is depressed AND gate 26 actuates clock pulse generator 29 through OR gate 23. The output pulse of clock pulse generator 29 increments counter 19 and sets flip-flop 27, thereby turning off AND gate 26 and removing the turn-on signal from the clock pulse generator. Depressing the JOG switch when the MODE switch is in either of the MANUAL or SET-UP positions therefore increments counter 19 by one.

The output of CONNECT switch 7 is connected to an input of AND gate 33. A second input for AND gate 33 is provided by the SET-UP output of MODE switch 2. The output of AND gate 33 provides a turn-on signal for pulse generator 34. The output pulse from pulse generator 34 is utilized as a "write" pulse by random access memory 16. In addition, the output pulse from the pulse generator 34 is connected through OR gate 35 to delay circuit 36, and is then provided as a "read" signal for memory 16. Thus, when the MODE switch 2 is in the SET-UP position and the CONNECT switch is depressed, the contents of register 14 are read into the memory 16 through logic matrix 15. After a delay determined by delay circuit 36 the contents of memory 16 are read into the register 14 and may be confirmed as the most recently entered information by observing COMMAND WORD INDICATOR lights 10. "Read" signals are also provided to memory 16 by clock pulse generator 29 through OR gate 35 and delay circuit 36, NOR gate 20$a$, and of each of the OR gates 20 are connected to preset inputs of counter 19. The outputs of counter 19 are connected to corresponding indicators of the PROGRAM STEP display 5 and to inputs of the logic matrix 15. The output of CONNECT switch 7 is connected to an input of logic matrix 15. The LOAD switch 6 is connected through inverter 18 to the first inputs of AND gates 17. The second inputs of AND gates 17 are provided by outputs of the logic matrix. The outputs of the industrial process controller are provided on output terminals 31 which are each connected to an output of a corresponding AND gate 17. The input terminals 30 of the logic controller are connected directly to logic matrix 15. Input and output lines are also connected between logic matrix 15 and a random access memory 16. Logic matrix 15 is shown as a single block with a plurality of input and output lines. In reality, the internal configuration of logic matrix 15 contains code word recognition logic circuits for interpreting command portions of the logic words from register 14, and gate circuits responsive to the code recognition circuits for completing connections between the OR gates 13 and the random access memory, between the register 14 outputs and AND gates 17, between input terminals 30 and AND gates 17 as well as between outputs of register 14 and counter 19. In addition, the logic matrix 15 provides a conduction path between the outputs of counter 19 and random access memory 16, as well as between the random access memory 16 and the register 14 through OR gates 13.

HOME switch 4 consists of three rotatable switches, each manually settable to ten positions. The output of HOME switch 4 is a binary coded decimal signal on twelve output lines. In order to simplify the description only three output lines are illustrated in FIG. 1. Each of the output lines from HOME switch 4 is connected to an input terminal of a separate AND gate 21. The second inputs of all of the AND gates 21 are connected in common to an output of AND gate 22. An output of each AND gate 21 is connected to an input of a separate OR gate 20.

Referring to FIG. 2, a logic circuit is shown wherein the START switch 11 and JOG switch 8 may be combined into a single push button START/JOG switch. The MANUAL output of MODE switch 2 is connected in FIG. 2 through OR gate 201A to an input of AND gate 201 and to an input of OR gate 204. A second input for OR gate 201A is provided by the SET-UP output of MODE switch 2. Manual depression of the START/JOG switch (not shown) on the controller panel 1 provides a second input to AND gate 201, resulting in a JOG signal on the output of AND gate 201. As shown in FIG. 1, the JOG signal is connected to an input of AND gate 26 and to inverter 28. The RUN output of MODE switch 2 is connected to an input of AND gate 202. If the MODE switch is set to the RUN position and the START/JOG switch is depressed AND gate 202 triggers flip-flop 203 to the "set" condition whereby the Q output of flip-flop 203 provides a "START" signal. As in FIG. 1 the "START" signal will be connected to an input of OR gate 23. In this manner the AND gates 24 and 24A, flip-flop 24B, OR gate 24C and inverter 24D are replaced.

Referring to FIG. 3, the circuits of the logic matrix shown therein serve to control the flow of signal information from one part of the industrial process controller to another. Thus, the outputs of command register 14 are connected to inputs of the random access memory through the logic matrix.

Logic recognition circuitry consists of AND gates 301 through 306. Each of the circles on an input of the AND gates indicates that the input signal is inverted prior to its application to the AND gate. All of the recognition circuits are connected to three lines, and each recognition circuit provides a logical 1 in response to a single combination of logic signals on the three lines. The outputs of logic recognition circuits 303 and 304 are not shown as connected to the remainder of the logic matrix and are present merely to provide additional logical functions that may be wired into the logic matrix if a more complex process control program is necessary. Of course, since eight unique signal combinations are possible on these three lines two additional AND recognition gates (not shown) may also be provided if necessary. Logic recognition circuits 305 and 306 recognize logic commands specifying logical functional relationships between signals on input terminals 30 of the controller. The output of logic recognition AND gate 305 is connected to a first input of each of the AND gates 314, while the output of recognition circuit 306 is connected to first inputs of AND gates 315. The second and third inputs of AND gates 314 are connected to selected input terminals 30. The first and second inputs of OR gates 319 are connected in the same manner to selected inputs from input terminals 30. The outputs or OR gates 319 are connected to the second inputs of AND gates 315. The outputs of AND gates 314 as well as AND gates 315 are connected through OR gates 313 to AND gates 17 of the controller. The output of logic recognition AND gate 302 is connected in common to first input terminals of each of AND gates 312. The second inputs of AND gates 312 are connected to the outputs of four stages of the COMMAND register 14. The outputs of AND gates 312 are connected through the inputs of OR gates 313 to inputs of AND gates 17. The output of recognition AND gate 301 is connected to a first input of AND gate 307. The second input of AND gate 307 is provided by a signal from a remote control unit (not shown) on line 310 through inverter 311. The output of AND gate 307 is connected to NOR gate 20A and is connected in common to each of the first inputs of AND gates 308. The outputs of two of the AND gates 308 are connected to OR gates 20, while the output from the third AND gate 308 is connected to an input of OR gate 309. The second input of OR gate 309 is provided by a signal from the remote control unit. The output of OR gate 309 provides a signal for the third OR gate 20. The logic matrix is also used to conduct storage location identification for the random access memory from counter 19 as well as to connect the output lines from the random access memory to register 14 through OR gates 13.

PROGRAMMING AND OPERATION

In order to enable the process controller to perform a simple three step program, we shall set the HOME switch to some digital number such as 001 (Step No. 1). The MODE switch is turned to the SET-UP position. In this position the output signal from the SET-UP portion of the MODE switch enables AND gate 22. Thus, when the HOME command switch 3 is actuated, signal from the HOME COMMAND switch 3 is passed through AND gate 22 to a first input of each of AND gates 21. AND gates 21 thereby connect the HOME switches to the counter 19 through OR gates 20, thereby presetting the counter 19 to the number selected by the HOME switch 4. In addition, the output of AND gate 22 resets the highest significant digit of counter 19 to 0 through NOR gate 20A. The counter now contains the number selected by the HOME switch. This number is displayed in the PROGRAM STEP display 5. in addition, the output of the counter 19 is the memory address code for random access memory 16. Next, the COMMAND WORD SELECTION switches 9 are depressed in a pattern corresponding to the desired program command for this step. The output of the SET-UP terminal of the MODE switch enables each of AND gates 12 to pass the selected logic word from the COMMAND WORD SELECTION switches 9 through OR gates 13 to the register 14. The output of each register stage is connected to a COMMAND WORD INDICATOR light 10 thereby displaying above the selector switches 9, the selected command word. Actuation of the CONNECT switch 7 conducts the output of register 14 through the logic matrix 15 to a location in random access memory 16 indicated by the output of counter 19 by passing a signal through AND gate 33 to pulse generator 34, thereby providing memory 16 with a "Write" signal. The process above described is repeated for each step of the program. At a predetermined program step a series of emergency shut-down instructions are similarly programmed. On three of the output lines from register 14 (more may be used depending on the complexity of the process to be controlled) program command words are located, having been selected by LOGIC WORD SELECTION switches 9 stored in memory 16 and reread into register 14. The program command words specify the command, indicate signal levels to be applied to output terminals 31, logic functions to be performed on signals from input terminals 30 and to be directed to selected output terminals 31, or may direct the programmer to proceed to a specified program step other than the next sequential program step.

After the program has been stored in the random access memory the MODE switch 2 will be set to the MANUAL position in order to check out the program. A normally logic 0 output from JOG switch 8 is converted into a 1 signal by inverter 28 and maintains flip-flop 27 in a reset condition. Thus, the $\overline{Q}$ output of flip-flop 27 normally produces a logic 1. The normal Q output of flip-flop 27 combined with the output of the MANUAL position of the MODE switch 2 enables AND gate 26. Thus, when JOG switch 8 is depressed it removes the logical 1 from the reset input of flip-flop 27 and provides a logic signal level 1 through OR gate 23 to clock pulse generator 29, thereby enabling the clock pulse generator to provide a first pulse. The first pulse output of clock pulse generator 29 switches flip-flop 27 to the set condition, thereby changing the $\overline{Q}$ output thereof to a logical 0, and consequently disabling AND gate 26. The resulting logical 0 signal from AND gate 26 removes the energizing level 1 from the clock pulse generator. Thus, the clock pulse generator 29 in response to the MANUAL position of the MODE switch and the depression of the START/JOG switch provides a single output pulse to counter 19, thereby increasing the count by one. In response to each program step output of counter 19 and in response to the "read" signal from delay element 36 random access memory provides a stored logic word through logic matrix 15 as well as through OR gates 13 to register 14. With the MODE switch in the RUN or MANUAL position the enabling output for AND gates 12 is no longer present. Thus the COMMAND WORD SELECTION switches are isolated from register 14. At any time, if desired, a logic output from LOAD switch 6, converted by inverter 18 into a logical 0 will isolate the output terminals 31 of the controller from the apparatus to be controlled by disabling each of AND gates 17, thereby turning off all the controller outputs 31. If any of the program steps are in error at this point they may be corrected merely by actuating the MODE switch to the SET-UP position, selecting the program word with the HOME selection switches 4, and depressing the HOME command switch 3. The command word may now be altered by depressing switches 9 actuating CONNECT switch 7, thereby replacing the undesirable program step with the newly selected step.

After the program has been checked the MODE selection switch may be set to the RUN position, thereby enabling AND gate 24. Thus, by depressing the START switch 11 a logical 1 signal will be passed through AND gate 24 and OR gate 23 to clock pulse generator 29, thereby producing a series of clock pulses that will sequentially set counter 19 to each of the selected program steps. At any time in the program, however, in response to a command word indicating that the program sequence is to be shifted to a program step other than the next sequential program step, an output from the logic matrix 15 through OR gates 20 will set counter 19 to the selected program step number as specified in that command word. Therafter, the clock pulse generator will provide counter 19 with pulses that will cause the counter to be set to the next sequential setting past the selected program step. If a command word reads from the random access memory 16 into the register 14 directs the setting of the controller outputs 31 to particular levels specified in a portion of the command word stored in register 14, the logical matrix will conduct the selected signal level through enabled AND gates 17 to the controller outputs 31. Thus, normally the LOAD switch 6 is not actuated and provides a logical 0 signal, converted by inverter 18 into a logical 1 signal in order to enable AND gate 17.

If, on the other hand, a command word stored in register 14 indicates that a particular logic function is to be performed on signals at input terminals 30, the logic matrix contains the logic elements necessary to perform this command.

Referring to FIG. 3, if the MODE switch is in the SET-UP position when a logical 1 is applied from CONNECT switch 7, the AND gate 33 causes pulse generator 34 to provide a "Write" signal. As a result the logic word set into register 14 is written into random access memory 16 by selecting a given pattern of switches 9. The logic word is stored in memory 16 in response to the pulse from pulse generator 34, at a location indicated by the output of counter 19. In the RUN or MANUAL positions of the MODE switch 2 each new binary coded decimal number from counter 19 causes the random access memory to provide the program command stored in the corresponding memory location through OR gates 13 to the various stages of register 14. In response to the logic word 000 logic recognition AND gate 301 will provide a logical 1 signal to enable AND gate 307. Line 310 from the remote control signal normally contains a logical 0 which is converted into a logical 1 by inverter 311 and thereby normally passes the signal from recognition AND gate 301 to the first inputs of each of AND gates 308. A desired out-of-sequence program step from the next three lines containing the output of three additional stages of shift register 14 is passed through AND gates 308. The outputs of two of the AND gates 308 are directly connected through two OR gates 20 into counter 19. The output of the third AND gate is connected to an additional OR gate 20 through OR gate 309. Furthermore, the logical 1 output of AND gate 307 is connected to an input of NOR gate 20A, thereby setting the highest significant digit of counter 19 to 0. The remaining counter stages are set to the desired program step stored in three stages of shift register 14. Thus, in response to the command word 000 the normal sequence of steps is broken and the program may be advanced to skip several program steps or the controller may be programmed to repeat a sequence of steps.

In response to the logic signal 001 on the program command stages of register 14 a logical 1 from logic recognition AND gate 302 will enable each of AND gates 312. Thus, selected output terminal levels stored on four additional register elements will be passed through AND gates 312 as well as OR gates 313 to AND gates 17, and thereby to the output terminals 31.

In response to a logical word on the program command stages of COMMAND register 14 indicating that the first and last two input terminals 30 are to be combined by an "AND" function the logical word 110 will cause recognition AND gate 305 to provide a logical 1 signal to first inputs of AND gates 314, thereby enabling AND gates 314 to perform the desired logical function and to pass the results thereof through two of the OR gates 313 to two of the AND gates 17. If, on the other hand, the logic word 010, indicating that the first and last two signals on the input terminals 30 are to be combined in "OR" functions, recognition AND gate 306 provides a logical 1 signal to enable AND gates 315. Thus, the desired logical functions provided by OR gates 319 are connected through OR gates 313 to selected output AND gates 17.

If it is desired to shut down a controlled process from a remote location a logical 1 signal on line 310 converted to a logical 0 signal by inverter 311 will disable AND gate 307, thereby disabling AND gates 308, and preventing out-of-sequence program instructions stored in register 14 from affecting counter 19. In addition, a second line from the remote control unit passes a logical 1 through OR gate 309 and one of the OR gates 20 to set counter 19 to a predetermined number (in this case number 4) which will be the first number in a programmed shut-down sequence for the process being controlled.

From the foregoing it will be seen that the Industrial Process Controller system is quite versatile in its programming flexibility. It can be used to repeat a numbr of steps by making the selected out-of-sequence program step an earlier step in the program. Any program step can be immediately changed without disconnecting the controller and without logic recognition circuits can be used to initiate other actions providing the possibility of a more complex control program if the controlled process requires it.

Although groups of gates of specific configurations are disclosed it will be understood that other gating configurations may be substituted by the skilled logic designer for accomplishing the inventive purpose. For example, AND and NAND gates, OR and NOR gates, etc., are interchangeable by virtue of signal definition.

Other variations, modifications, alterations, additions and omissions within the scope of the invention will be apparent to one skilled in the art.

What is claimed is:

1. An industrial process controller having run, manual, and set-up modes wherein process control digital information words may be stored and recalled, each word being associated with one of a plurality of numerically ordered program steps, the controller being capable of operating on one program step at any given time and comprising:

a panel, manually operated MODE switch means on said panel for selecting one of said run, manual and set-up modes, manually operated HOME switch means on said panel for numerically selecting any one of said ordered program steps, signal operating sequencing means for setting said controller to sequentially operate on said plurality of program steps in response to a RUN signal, PROGRAM STEP display means on said panel for numerically displaying a current program step on which said controller is operating, manually operated HOME COMMAND switch means on said panel for setting the industrial process controller to said manually selected program step,
a COMMAND storage register means comprising a plurality of storage elements,
a plurality of manually operated PROGRAMMING switches on said panel, each of said PROGRAMMING switches corresponding to a bit of one of said digital words and being connected to a separate storage element of said COMMAND storage register means in response to said set-up mode of said controller,
a randomly accessible memory means for storing digital words in locations corresponding to said program steps,
manually operated CONNECT switch means on said panel and operable in said set-up mode for storing in said memory means a digital word from said storage register means selected with said PROGRAMMING switches in a storage location of said random access memory corresponding to said program step,
a plurality of output terminals connected to said controller for providing signals for a process being controlled,
means connected to said storage register means and to said output terminal means responsive to a first plurality of said digital words in said register for providing defined output signals on said output terminal means,
manually operated START swtich means on said panel and functional in said RUN MODE for providing said RUN signal, thereby automatically sequentially setting said controller to each of said program steps,
means responsive to said RUN and MANUAL modes of said controller and to the setting of the controller to a particular program step for reading the digital word corresponding to said particular program step into said storage register means whereby said output terminals are sequentially provided with signals corresponding to the digital words manually selected with said programming switches,
means responsive to a second plurality of said words for setting said controller to a program step directed by said second plurality of words, and
manually operated JOG switch means on said panel and functional in said MANUAL and SET-UP modes of said controller for selectively setting the controller to the next sequential program step.

2. An industrial process controller as defined in claim 1, further comprising a plurality of input terminals,
a logic matrix having input and output terminals and providing a plurality of selectable logical functions,
and means responsive to a third plurality of said digital words specifying logic function relationships between signals on selected input terminals of said controller and defining output terminals of said controller on which the result of the application of the functional relationships to said controller input signals is to be provided for connecting said selected input terminals to those input terminals of the logic matrix providing the specified logic functions and for connecting the logic matrix output terminals to said selected controller output terminals.

3. An industrial process controller as defined in claim 1, further comprising:
a plurality of indicators on said panel, each of said indicators being connected to a separate stage of said COMMAND storage register, said indicators providing a visual indication of the contents of said register.

4. An industrial process controller as defined in claim 1, further comprising:
manually operated LOAD switch means for selectively setting all of the signals on the output terminals of said controller to zero.

5. An industrial process controller as defined in claim 1, further comprising:
means for receiving remote control signals from a location spaced from said controller panel for setting said controller to a predetermined program step, whereby the process controlled by said industrial controller may be interrupted from a remote location, and whereby an emergency action program initiated at said predetermined program step may be selected from said remote location.

6. An industrial process controller as defined in claim 1, wherein said manually operated START switch means and said manually operated JOG switch means both comprise a single push-button switch, hereinafter referred to as a START/JOG switch, first AND gate means having inputs connected to MANUAL output of the MODE switch and to the START/JOG switch for providing a Jog signal in said MANUAL mode of the controller to set the controller to the next sequential program step, a second AND gate means having inputs connected to said START/JOG switch and to the RUN output of said MODE switch for providing a START pulse, flip-flop means connected to said second AND gate and triggerable to a first stable state for providing a START signal to automatically sequentially set the controller to each of the program steps, a STOP switch, OR gate means having inputs connected to said MANUAL and SET-UP outputs of said MODE switch and to said STOP switch and having an output connected to said flip-flop for triggering said flip-flop to a second stable state wherein said START signal is removed, whereby said sequence of program steps is interrupted.

* * * * *

UNITED STATES PATENT AND TRADEMARK OFFICE
CERTIFICATE OF CORRECTION

PATENT NO. : 4,006,464

DATED : February 1, 1977

INVENTOR(S) : William F. Landell

It is certified that error appears in the above-identified patent and that said Letters Patent are hereby corrected as shown below:

Column 2, line 13, change "33" to read --3--.

Signed and Sealed this

Thirty-first Day of May 1977

[SEAL]

*Attest:*

RUTH C. MASON
*Attesting Officer*

C. MARSHALL DANN
*Commissioner of Patents and Trademarks*